US008464969B2

(12) United States Patent
Ziegler

(10) Patent No.: US 8,464,969 B2
(45) Date of Patent: *Jun. 18, 2013

(54) METHOD OF MAKING PROPPANTS USED IN GAS OR OIL EXTRACTION

(75) Inventor: Mark J. Ziegler, Rockford, IL (US)

(73) Assignee: Unimin Corporation, New Canaan, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 13/197,520

(22) Filed: Aug. 3, 2011

(65) Prior Publication Data
US 2011/0290917 A1 Dec. 1, 2011

Related U.S. Application Data

(63) Continuation of application No. 12/556,737, filed on Sep. 10, 2009, now Pat. No. 8,235,313.

(60) Provisional application No. 61/098,746, filed on Sep. 20, 2008.

(51) Int. Cl.
B02C 19/06 (2006.01)

(52) U.S. Cl.
USPC .............. 241/5; 241/26; 241/40; 241/284

(58) Field of Classification Search
USPC .............................. 241/5, 26, 40, 284
See application file for complete search history.

(56) References Cited

U.S. PATENT DOCUMENTS

| 2,813,318 | A | | 11/1957 | Horth | |
|---|---|---|---|---|---|
| 3,929,191 | A | * | 12/1975 | Graham et al. | 166/276 |
| 4,050,637 | A | | 9/1977 | Eirich et al. | |
| 4,879,181 | A | * | 11/1989 | Fitzgibbon | 428/402 |
| 5,188,175 | A | * | 2/1993 | Sweet | 166/280.2 |
| 5,334,364 | A | | 8/1994 | Aguirre-Villafana et al. | |
| 2007/0114029 | A1 | | 5/2007 | Kazi | |
| 2010/0071902 | A1 | | 3/2010 | Ziegler | |
| 2010/0193189 | A1 | * | 8/2010 | Pershikova | 166/280.2 |

OTHER PUBLICATIONS

Choosing Fracturing Sand to Optimize Permeability Achieved vs Cost, Article by Halliburton relating to frac sand, Copyright 2005.
Wisconsin's diamonds: Frac Sand, Article by Journal Sentinel Inc., Copyright 2005-2007.
Eirich; "Intensive Mixer"; Maschinenfabrik Gustav Eirich GmbH & Co. KG, Apr. 2003.
International Search Report and Written Opinion for Application No. PCT/IB2009/055883, mailed Oct. 18, 2010, eleven pages.

* cited by examiner

Primary Examiner — Bena Miller
(74) Attorney, Agent, or Firm — Rankin, Hill & Clark LLP

(57) ABSTRACT

A method of making frac sand having a selected grade from a naturally occurring, mined sand having a $SiO_2$ content of at least about 80 percent and having a particle size range where the maximum particle size is less than about 8.0 mm, comprising: crushing the mined sand into an intermediate particulate material; screening the particulate material into a feedstock with particles having a particle size coarser than about 350 mesh and initial values for roundness and sphericity of the particles; passing the particles of the feedstock through a blast tube with an outlet to pneumatically abrade the particles and propel the feedstock in a stream under a given pressure from the outlet; directing the pressurized stream against a fixed target located at a given distance from said outlet to physically abrade the particles to form an output mass containing abraded particles: and, repeating operations (c) and (d) a number of times or process stages until the particles resulting from the repeatedly abraded output mass is a final output mass having both processed roundness and sphericity values of at least 0.6 and wherein the values are greater than the initial values of the feedstock by at least about 0.10 to 0.50.

27 Claims, 7 Drawing Sheets

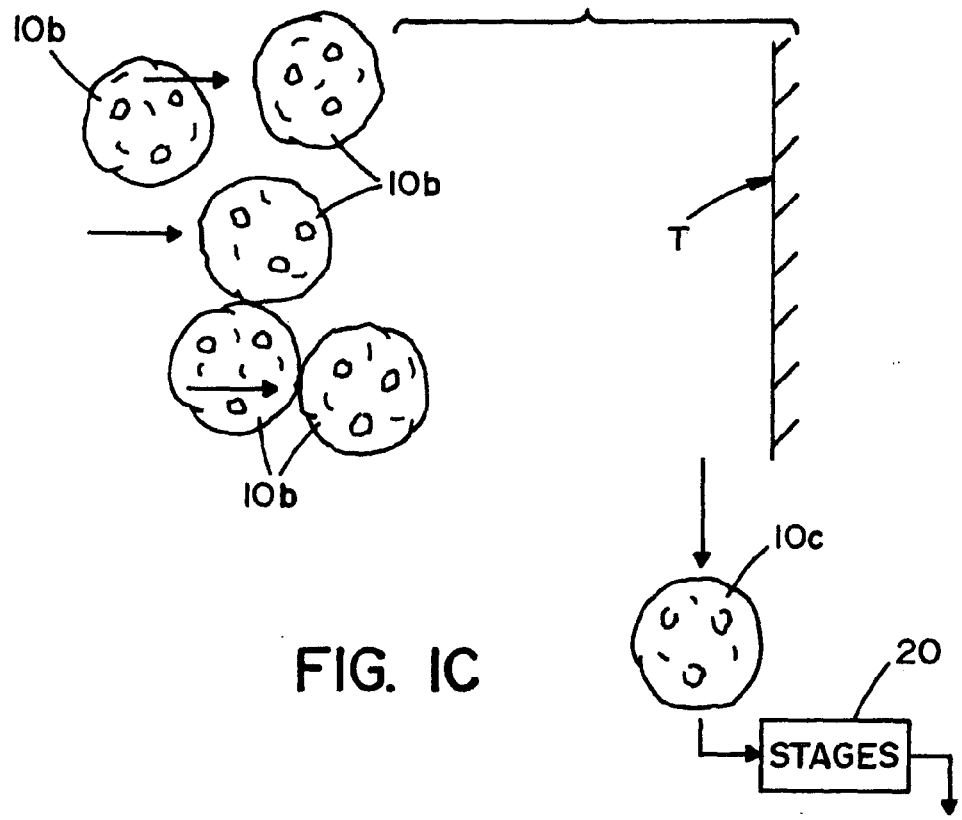
FIG. IC
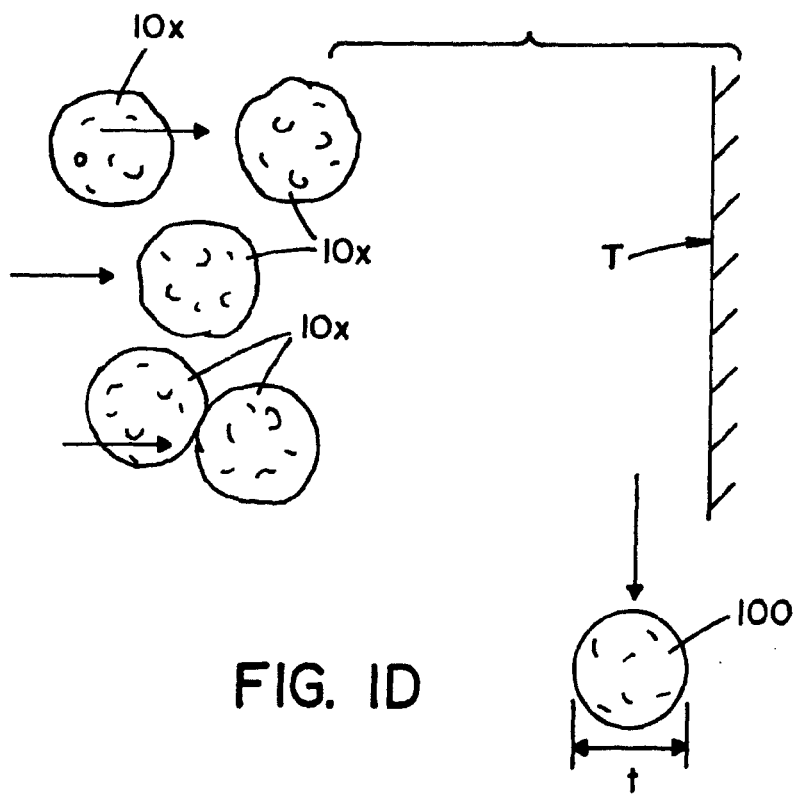
FIG. ID

METHOD OF MAKING PROPPANTS USED IN GAS OR OIL EXTRACTION

This application is a continuation of U.S. Non-provisional application Ser. No. 12/556,737 filed on Sep. 10, 2009 (still pending) which claims the benefit of prior provisional application (UMEE 2 00109 P) Ser. No. 61/098,746 filed Sep. 20, 2008 both of which are incorporated by reference herein as if contained in this specification. The invention relates to the art of processing naturally occurring minerals and preferably processing somewhat common silica sand. More particularly, the invention is directed to a novel method of making a proppant from naturally occurring silica sand, which proppant is referred to by the American Petroleum Institute (API) as "frac sand."

BACKGROUND

A proppant is a mass of spherical particles to be forced under pressure into lateral fissures in a well or bore for extraction of a gas or oil well. The proppant must be able to flow into the fissure to form a "pack" that maintains exit flow to the outlet of the gas or oil extraction bore. Consequently, it requires particles with a relatively uniform, spherical shape characteristic, as well as the ability to absorb a crushing force often exceeding 4000 psi. Naturally occurring frac sand is a silica sand conforming to these requirements. It has a crushing parameter, known as the "k value", which value is normally 1 to 12, i.e. 1000 psi to 12,000 psi. Only a limited number of silica sand deposits provide a frac sand by having a high degree of roundness and a high degree of sphericity, as well as a high crushing resistance. Consequently, only the sand from these specific mines or areas are acceptable for use as a proppant for oil or gas extraction. With the present demand for production of more oil and gas, such unique natural silica sand applicable as a proppant is now becoming in short supply. Thus, it is very high priced sand when purchased on the open market. Such special sand known as "frac sand" has a high roundness and high sphericity (which measures the curvature of the individual particles and how the particles compare to a perfect sphere). These values are generally greater than 0.6, wherein 1.0 is perfection. Such limited available naturally occurring "frac sand" forms the background and objective of the present invention. The invention is creation of a "man made" or synthetic frac sand from common and inexpensive silica sand. However, it has been determined that this invention can be used for processing other hard materials into an acceptable proppant. Furthermore, the invention has also been converted into a method for processing other granular naturally occurring minerals, such as olivine, as used in foundries.

SUMMARY OF INVENTION

The preferred embodiment of the present invention is a method of converting somewhat ordinary naturally occurring silica sand having a roundness and/or sphericity as low as 0.2-0.4 into a "frac sand" having a roundness and sphericity of greater than 0.6 and preferably greater than 0.7. Somewhat common, naturally occurring sand has a "as mined" particle shape classified as "round" to "angular." In other words, the silica sand to be converted does not have a high degree of roundness or sphericity and often does not have the crush resistance necessary for use as a frac sand. The classification "round" is used in the art of sand particles; but, it does not mean that the particles have a high roundness or a high sphericity. The preferred embodiment of the invention involves the method of converting such naturally occurring sand into acceptable frac sand having a selected grade, which is commonly 20/40, 16/30, 30/50 & 40/70. As is known, the grade of frac sand is determined by the maximum screen size through which the particles pass and the minimum screen size through which the particles do not pass. Consequently, the grade of frac sand is defined by the maximum screen size and the minimum size of the particles. The grade is selected to determine the function of the frac sand and its permeability. In frac sand grading, the maximum screen size is 6-35 mesh and the minimum screen is 30-140 mesh.

The strength of the frac sand is measured by applying a pressure to a mass of the sand and determining how much pressure the sand can absorb without losing 10% of its weight by the crushing action. Frac sand needs to have a k value of 1-12, which indicates that the pressure absorbed by a mass of sand without a loss of more than 10% of weight is between 1,000 psi and 12,000 psi. This is the standard proppant strength for the naturally occurring frac sand and is duplicated by the present invention. The k value of acceptable proppant is a characteristic set forth by the American Petroleum Institute (API) & ISO, the organizations that define the requirements for a proppant used in gas and oil extraction. Another parameter of a proppant as set by API/ISO is permeability which is measured by the flow of a fluid through a mass of proppants as it is compressed by a specific pressure between 1-12 k psi. The permeability of the proppant pack decreases with pressure and should have a permeability of at least about 25 Darcy at a maximum of 6,000 psi.

The invention converts naturally occurring silica sand into a frac sand for use as a proppant having the physical properties set forth by API/ISO. Thus, the invention involves the method of converting such naturally occurring silica sand into an acceptable frac sand having a grade as selected by the ultimate user. The selected grade is for the desired function in a specific type of oil or gas well. Even though the invention was developed to make frac sand from common silica sand, the invention has been determined to be more universal in its implementation by merely changing the hard material used as a feedstock in practicing the new process. The invention improves the characteristics of certain man made proppants, even though the invention was developed to process naturally occurring silica sand. It has been found that the invention also converts naturally occurring olivine into an olivine having particles with a roundness and sphericity exceeding 0.6 and preferably 0.7. Such olivine has been found to be more advantageous and improved in properties when used as a foundry sand. This is the general statement of the method constituting the present invention and its specific use for converting silica sand into a proppant and certain ancillary uses as determined by further research and development after discovering the invention.

STATEMENT OF THE INVENTION

The primary aspect of the present invention is the discovery of a method of making a man-made version of naturally occurring frac sand. The created frac sand has a selected grade and is made from naturally mined silica sand having a $SiO_2$ content of at least about 80%. In accordance with the invention, the somewhat common silica sand is crushed into an intermediate particulate material and then screened into a feedstock with particles having a particle size that is coarser than about 350 mesh with an initial value of roundness and sphericity not acceptable for a frac sand to be used as a proppant. The feedstock is then passed through a blast tube having an outlet to pneumatically abrade the particles and propel the particles into a stream under a given pressure from an outlet of the blast tube. The pressurized stream of feedstock is directed to crash against a fixed target located at a given distance from the outlet of the blast tube. The particles of the feedstock are physically abraded by particle to particle contact and target collision to form an output mass containing abraded particles with increased roundness and sphericity. This two step abrading of the feedstock is performed in a single stage and is repeated a number of times until the particles resulting from the repeat abrading action creates an acceptable output mass. The product is a final output mass having roundness and sphericity values of at least 0.6 and preferably at least 0.8. As a general matter, the roundness and sphericity values of the final output mass are greater than the initial values of the feedstock by at least 0.10. An improvement in the roundness of 0.10 is considered significant in the creation of the frac sand so long as the resulting roundness and sphericity values are at least 0.6. Thus, original roundness of 0.5 is processed to give at least a roundness of 0.6. If the original roundness is 0.2 then the process is performed until the roundness of the final output mass is at least 0.6. After the abrasion process to create the desired roundness, the final output mass is screened to extract the "selected", desired grade for the proppant. The frac sand is then measured for k value and is marketed as a frac sand in competition with naturally occurring frac sand located in only a few specific areas of the world.

When the invention is performed, the repeated pneumatic abrading of particles takes a total process time, which time is a combination of the time for individual stages of the abrasion action. In practice, this resident time is in the range of 1-25 minutes for each stage of the abrading action using the blast tube and target embodiment of the invention. The process also involves removing dust or small particles from the mass of particles as the mass is being repeatedly passed through the dual abrading operations. In the preferred embodiment of the invention, the roundness and sphericity values for the final output mass is greater than about 0.8. The small particles are removed from the sand mass being processed by a cyclone classifier set for the range of about 100-350 mesh. In accordance with one embodiment of the invention, the method is performed as an in-line process. In another embodiment, the process is a batch operation. Preferably, the process is an in line operation for two stages that are then repeated as a batch procedure.

The distance between the outlet of the blast tube and the fixed target is varied between 2-24 inches. The blast tube outlet has a diameter in the range of 4-8 inches. In practice, the fixed target is a frusto-conical structure with a flat steel plate generally orthogonal to the outlet of the blast tube used in the dual abrading action. The particles are abraded by contact between each other in the blast tube as well as by collision as a joint mass with the fixed target.

In accordance with another aspect of the invention, the process of the invention is performed by a system that involves a device for crushing mined silica sand into an intermediate particle material. This particle material is then screened into a feedstock with particles having a size coarser than about 350 mesh and with an initial roundness and sphericity not acceptable for proppants as defined by the API. The system involves a blast tube with an outlet to pneumatically abrade the intermediate particle material and propel the particles in an air stream under a given pressure from the blast tube for collision with a fixed target located a given distance from the outlet of the blast tube. Consequently, the feedstock is abraded by contact with the individual particles in the blast tube and then by the action of collision with each other and with the fixed target to form an output mass containing the abraded particles of feedstock. The action at the target is particle-to-particle abrasion, as in the tube, and collision with the target and with other particles at the target. The system involves a controller for repeating the passage of feedstock through the tube and against the target a number of times or process stages until the particles resulting from the repeatedly abraded output mass is a final output mass having both processed roundness and sphericity values of at least 0.6. The roundness and sphericity values are greater than the initial values of the feedstock by at least 0.10. After the feedstock has been converted to the output mass of particles capable of being used as a frac sand, the particles are then graded by a screen network to obtain the desired selected grade demanded by the ultimate customer. This grade can be of any value as defined above but is normally 20/40, 16/30, 30/50 or 40/70. The system uses a Simpson Pro-Claim sand reclaimer as the blast tube and fixed target. This device has heretofore been used to clean foundry sand by removing spent binder and other impurities in the used foundry sand. However, the commercial device has never been suggested for performing the inventive method or constituting the inventive system.

The method and system of the present invention utilizes the concept of pneumatically abrading the feedstock particles by pressurized grain to grain abrasion of the particles, as well as abrading the particles by crushing the particles against the fixed target under high speed and under high pressure. These processes are performed by the combination by the blast tube, in which particle to particle abrasion takes place, as well as the fixed target against which the abraded particles bombard each other and the target to increase the sphericity of the individual particles. The combined operations are repeated a number of times or stages until the particles resulting from the repeatedly abraded output mass is a final output mass having the desired increased roundness and sphericity.

In accordance with another aspect of the present invention the method and system are used to increase the roundness of various mined granular mineral having a hardness over 6 Mohs and capable of being used as a proppant.

In yet a further aspect of the invention, the method of making spherical proppants is used for a man made proppant, such as compound or clustered particles. Each of these particles is generally produced spherical but are often clumped together which distracts from their ability to be used as a proppant. Consequently, these compound or clustered particles are passed through a blast tube with an output to be pneumatically abraded and then propelled in a stream under a given pressure from the outlet of the tube against a fixed target located a given distance from the tube outlet. This action physically abrades the particles so that they are no longer agglomerated or clumped and are individualized and, thus, are enhanced for their acceptability as a man made proppant. The method of the present invention can be used to enhance the characteristics of man made ceramic particles which normally has higher k values than naturally occurring silica frac sand. This aspect of the method still involves the concept of particle to particle abrasion and collision with a fixed target until the individual particles are shaped so that they are optimized for use as a proppant in a gas or oil well.

Even though the invention contemplates the use of a fixed target against which the particles are bombarded, it has been found that in the broad sense, the particles being modified are merely impinged at high velocity against the metal member whether it is fixed or is not technically fixed. In accordance with the invention the metal is a "fixed" target; however, an equivalent procedure would be to employ a movable metal target against which the feedstock is impinged as it is also being abraded to change the shape of the individual particles.

In accordance with the various aspects of the present invention, the "selected" grade of frac sand has a maximum screen size of 6-35 mesh and a minimum screen size of 30-140 mesh. Preferably, the grade for the frac sand has a maximum size in the range of about 12-20 mesh and a minimum size in the range of about 40-70 mesh. The resultant proppant produced by the method and system of the present invention has a k value in the range of 1 k to 12 k and has a permeability of at least 25 Darcy at 6 k.

In accordance with a broad aspect of the present invention there is provided a method of making a material with spherical particles from a naturally occurring, mined granular material having a hardness of over 6 Mohs and having a particle size wherein the maximum particle size is less than about 8.0 mm. This method comprises crushing the mined material into an intermediate particulate material. The particulate material is then screened to remove particles coarser than about 350 mesh. These particles have an initial value of roundness and sphericity that is substantially less than about 0.6. Then the particles are abraded by particle-to-particle contact at high velocity and are also impinged at high velocity against a metal member. The abraded and impinging actions are continued until the particles constitute an output mass having both processed roundness and sphericity values greater than 0.6 and preferably greater than 0.8. As a further aspect of this definition of the invention, the metal member is a fixed target against which the feedstock is impinged at a high velocity. In accordance with an alternative aspect of the invention, the mineral is naturally occurring olivine.

These and other aspects of the invention are defined by the appended original claims of this application.

The primary object of the present invention is the provision of a method and system for converting naturally occurring silica sand into a frac sand for use as a proppant in gas and oil wells. The synthetic man-made frac sand meets the criteria of the API.

Another object of the present invention is to provide a method and system, as defined above, which method and system employs the interaction of surface to surface abrasion of particles and collision of the particles against a metal member until the particle has an increase in roundness and sphericity of at least 0.10 so that the roundness and sphericity is greater than 0.6 and preferably 0.8.

Still a further object of the present invention is the provision of a method and system, as defined above, which method and system utilizes a blast tube and a fixed target for the combined particle-to-particle abrasion and collision, which actions are simultaneously performed to increase the roundness and sphericity of naturally occurring silica sand so that it is capable of being used as a frac sand.

Still a further object of the present invention is the provision of a method that can be used to enhance the capabilities of a man made proppant, such as ceramic particles, and the roundness and sphericity of olivine to enhance its use in the foundry industry.

These and other objects and advantages will become apparent from the following description taken together with the accompanying drawings.

BRIEF DESCRIPTION OF DRAWINGS

In the drawings, FIGS. 1A-1D are schematic views representing the progression of particle shapes as the method and system of the present invention are implemented;

PREFERRED EMBODIMENTS

The preferred embodiment of the invention is described using the several drawings; however, the invention is not limited to the disclosed embodiment and is broader as defined by the appended claims.

Abrasion Process (FIGS. 1A-1D)

Figure 1A:
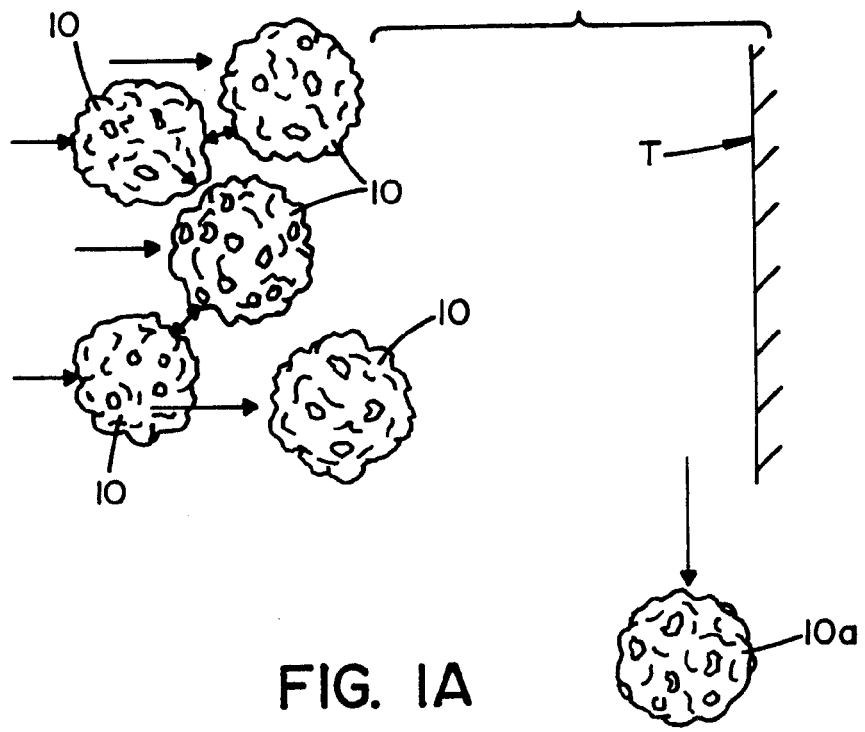
Figure 1B:
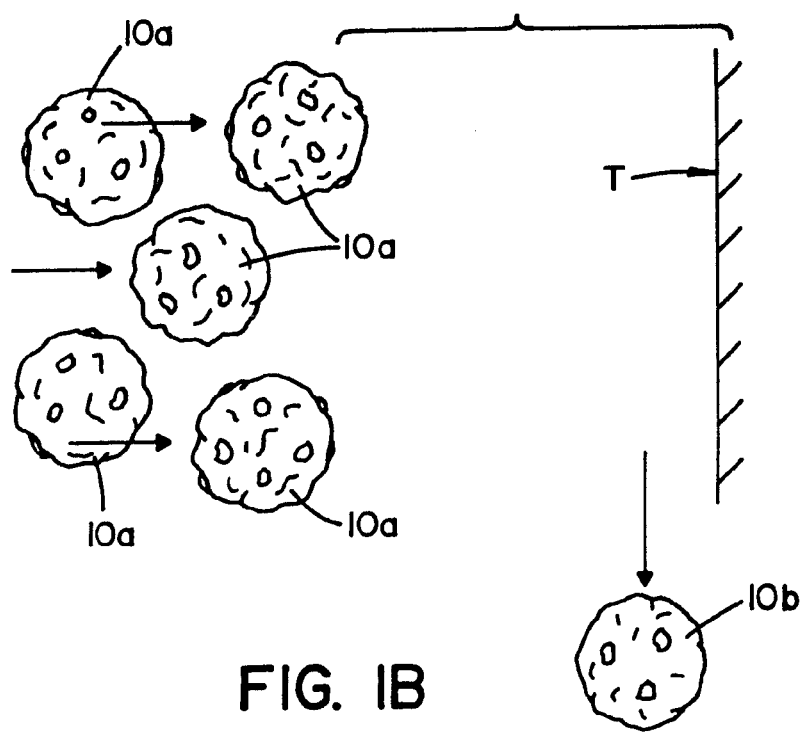

The invention involves the concept of taking a somewhat common, naturally occurring silica sand with a diverse particle shape and particle size and pneumatically abrading the individual particles by pressurized agitation together for grain to grain abrasion and then impingement of the particles as a mass against affixed target T, as schematically illustrated in FIGS. 1A-1B. A mass of particles 10 is a feedstock formed from particles of silica sand which has been screened to remove particles of a small size, such as a size less than about 50 microns. Optionally, the feedstock can be screened to remove large particles over about the size of a 5-6 mesh screen. Thus, the particles 10 have a size greater than about 50 microns and up to a large size such as 8.0 mm, but preferably less than about 5 mm. Particles 10 are driven at a high velocity by a fluid stream represented as arrows in FIG. 1A so that they are violently agitated against each other as they move toward fixed target T. They then impinge as a mass against the target so that the combined pneumatic abrasion caused by the contact of particles 10 with each other as they move toward target T and the actual collision of the particles against target T and particles at the target to form a processed particle 10a. Particles 10a have an increased surface uniformity from the naturally occurring shape of feedstock particles 10. The single stage of pneumatic abrasion and target collision is repeated as shown in FIG. 1B wherein particles 10a are again processed by abrasion and collision together with target T to form a further processed particle 10b. Such process stage is repeated as shown in FIG. 1C wherein the processed particles 10b are converted to the further processed particles 10c. As indicated by step or function 20, the stage of pneumatically abrading and colliding the particles against the fixed target is repeated several times to produce particles 10x. A mass of these particles 10x is passed through the last processing operation or stage as schematically illustrated in FIG. 1D so that the particles form a final processed mass of individual particles 100, having a diameter of t, which diameter will vary from a small size, such as about 50 microns, to the largest size of the incoming feedstock 10 in FIG. 1A. The abrasion process of grain to grain contact and target crashing of the particle mass is repeated many times or stages, each of which has a controlled resident time. This time for each stage is in the range of 5-25 minutes. Processing for a total resident time of successive stages is performed on the feedstock 10. The time is selected so the individual particles have an increased roundness and sphericity which is drastically improved from the initial roundness and sphericity values of feedstock particles 10. The values are increased a substantial amount, such as 0.10 to 0.40. Indeed, an improvement of 0.10 in roundness is drastic, so improving the roundness and sphericity from even a value of 0.5 to a value of 0.6 is significant in making frac sand. The pneumatic agitation of grain to grain contact and impingement or crashing into a fixed surface or target is repeated over and over in successive stages until the roundness and sphericity of individual particles, as measured in the laboratory, approach values useful for proppants as determined by API/ISO, which value is greater than 0.6 and preferably greater than 0.7 or 0.8. When the particles are given a standard crush test for proppants involving a mass of particles being crushed with a given pressure such as 4,000-10,000 psi. The amount of fines produced by the particles crushing procedure is measured. A 5 k proppant is one where 5 k psi crushing pressure results in less than 10% fines through the small or grading screen, as will be discussed with respect to FIG. 2. Thus, a successful crush test results in less than 10% fines dropping through the minimum screen at a given crush pressure. In practice, the present invention produces k values generally in the range of 4-6 k. Since the k value is somewhat indicative of the crystalline structure, the smaller particles in a selected grade of proppants helps in assuring that the k value is greater than about 4 k. Single crystal silica produces a k value of generally greater than 6 k. Thus, the "selected" grade for a frac sand produced by the invention is a grade that produces the desired k value demanded by the customer for the frac sand. The crush test k value is a specification assigned the frac sand grade by the ultimate customer. Thus, the k value is used by the manufacturer of the frac sand produced by the present invention to meet the requirement of the customer.

Figure 2:
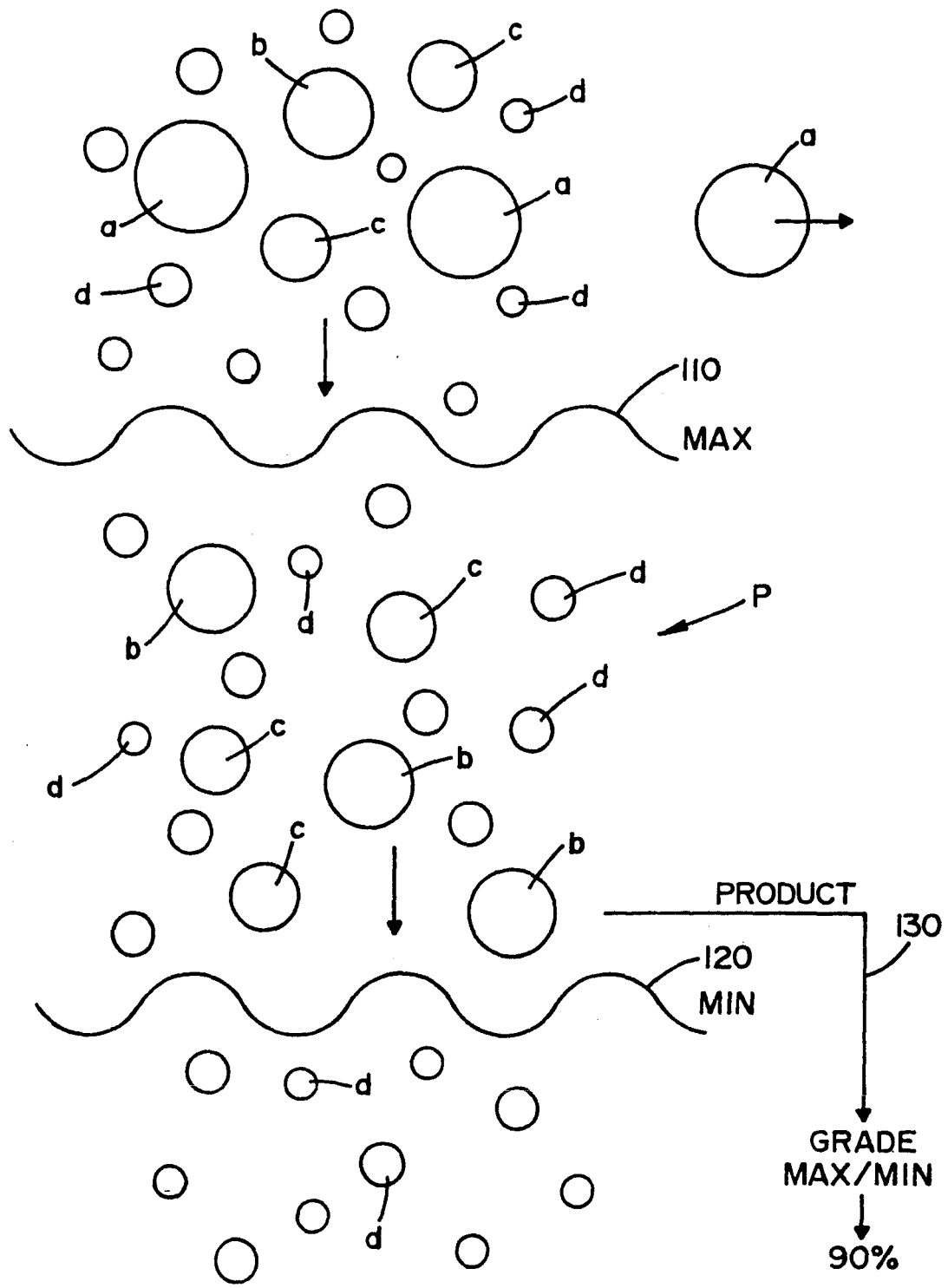
FIG. 2 is a schematic drawing of the grade selection process used in obtaining a "selected" grade for proppant produced by using the present invention.

Selected Grade (FIG. 2)

The invention involves producing frac sand with a particular "selected" grade which is normally 12-20 mesh over 30-50 mesh. The common grades are 20/40, 16/30, 30/50 and 40/70. However, frac sand can be graded with a maximum screen size of 6-35 mesh and a minimum screen size of 30-140 mesh. The grade of the produced frac sand is a number where the first value is the maximum particle size and the second value is the minimum particle size of 90% of the particles in the frac sand.

One aspect of the present invention involves selecting the desired grade of frac sand produced in the stages illustrated schematically in FIGS. 1A-1D. To grade the frac sand, the final output particles 100 having diverse diameters t were directed through a maximum size screen 110 shown in FIG. 2. Particles 100 have a variety of diameters, shown schematically as the different size particles a, b, c and d in declining values. Particles 100 having various diameters are passed through maximum screen 100, which has a screen size of 6-35 mesh. Particles a are too large to pass screen 100 so they do not progress into area P. These larger particles are removed from the top of screen 100. In area P the particles progress toward minimum screen 120 which has a value in the range of 30-140 mesh. Thus, the small particles d are removed from the area P. The particles remaining in area P constitute the product created by the present invention. This product is directed through conduit 130 to transportation vehicle which may be a bag or other container. The product in conduit 130 has a grade which is 90% between the maximum size determined by screen 110 and the minimum size determined by screen 120. Consequently, the method of the present invention involves directing the processed sand mass of particles 100 through a maximum size screen 110 that holds back large particles and then through lower screen 120 which determines the minimum particle size for the product. Screen 120 removes the small particles d. Consequently, the sand with a selected grade is the material removed from between the two grading screens. This concept is known in the art and is used in the present invention to determine the "selected" grade of the frac sand.

Figure 3:
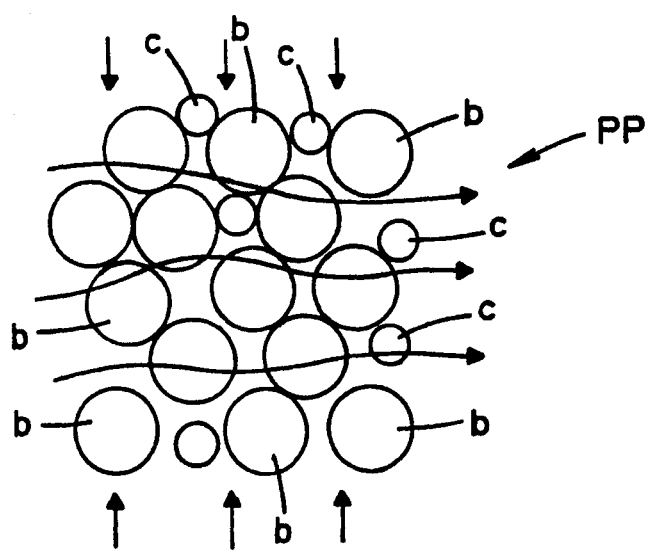
FIG. 3 is a schematic illustration of a proppant pack employing frac sand produced in accordance with the present invention.

Proppant Pack (FIG. 3)

In practice, the created frac sand has a maximum particle size of a little over a 1.0 mm and a minimum size of about 0.5 mm. Thus, the frac sand is a mass of particles which are fairly large so that they can allow a high permeability when the frac sand is in a proppant pack PP, as shown in FIG. 3. The mass of frac sand particles of pack PP are forced into a fissure where the pack keeps the fissure open when there is high pressure in a vertical direction against the proppant. This high pressure attempts to close the fissure and can approach several thousand psi. The proppant particles in pack PP have a high roundness and high sphericity so high pressure on the fissure of an oil or gas well holds the fissure open and does not prevent passage of gas and oil through the fissure. There is a permeability of at least 25 Darcy at 6 k due to the individual high roundness of the frac sand particles. Thus, oil and gas can be extracted when it would be otherwise unclaimable.

Figure 4:
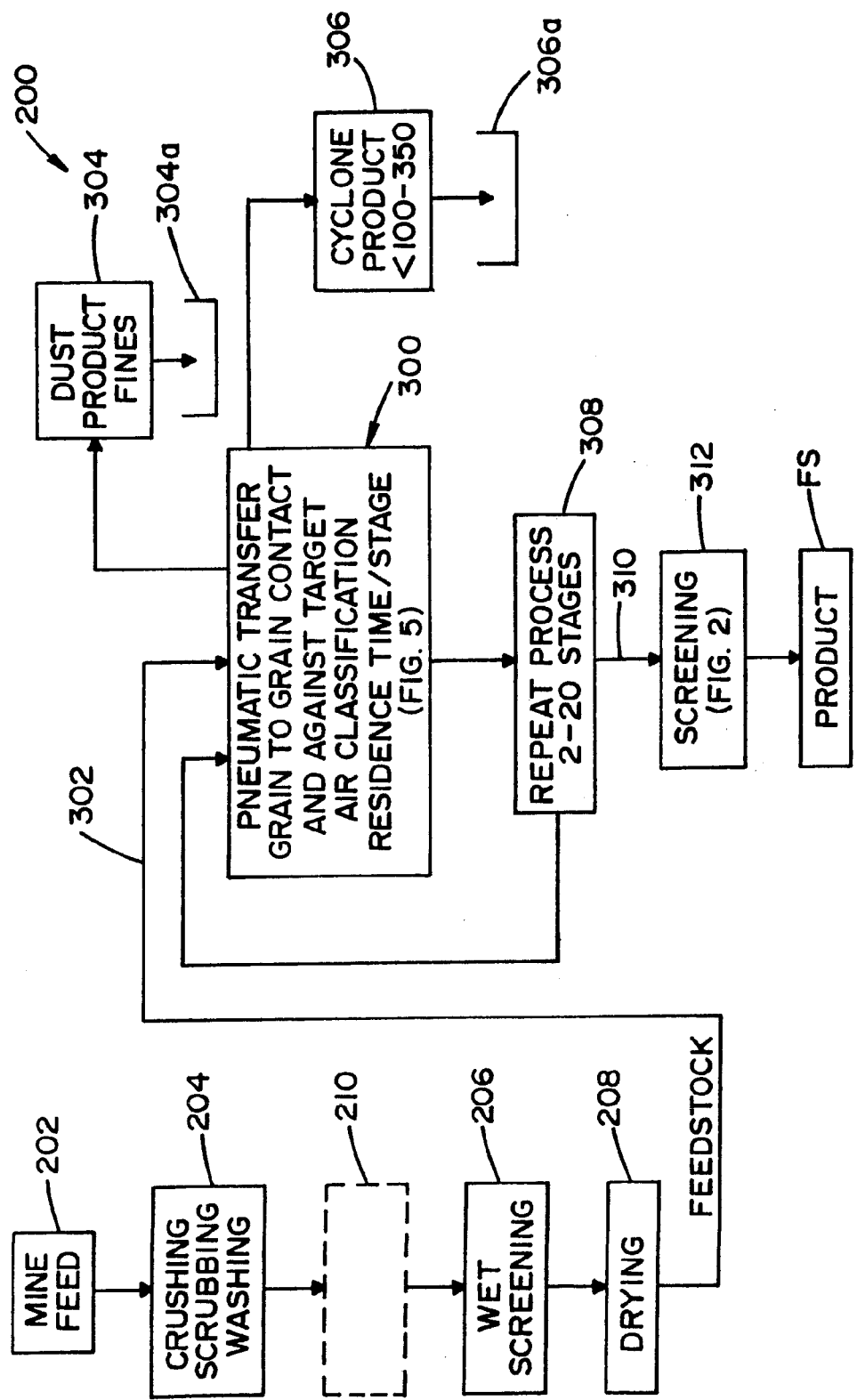
FIG. 4 is a block diagram of the preferred embodiment of the method constituting the present invention.

The Method 200 (FIG. 4)

The preferred embodiment of the present invention is method 200 illustrated in the solid line portion of FIG. 4. A somewhat common, naturally occurring silica sand is mined as indicated by step 202. The silica sand has a silica content greater than 80% and a hardness of over 6 Mohs. In the mined condition, the silica sand has large agglomeration of particles and is therefore crushed, scrubbed and washed as indicated by step 203. This operation is performed in accordance with standard practice in a silica sand mining operation. After the mined silica sand is crushed it is a mass of smaller particles in a slurry that is screened as indicated by step 206. The screened silica sand particles are then dried to produce a feedstock directed to station 300 where the feedstock is abraded by the individual particles colliding with each other and then abraded by the mass of particles colliding in a commingled mass against a fixed target. Station 300 is a device shown in FIG. 5, which is a two stage Simpson Pro-Claim apparatus 400. This particular commercial device is used to claim foundry sand and includes two separate stages for in-line processing. Feedstock from input line 302 is directed to station 300 for performing a dual, concurrent abrading action and target collision action on feedstock from drier 208. Each stage of the abrading operation at station 300 is performed for resident time that is generally in the range of 5-25 minutes. Thus, the feedstock entering station 300 from line 302 is processed in line by two successive stages, where the processed mass of particles is abraded in the same fashion by both processing stages. In the preferred embodiment, the wet screening at step or operation 206 removes particles of less than about 350 mesh. In accordance with an option as indicated by the dashed line step or operation 210, larger particles are removed from the feedstock. Thus, the particle size will be less than a given screen size, such as 6 mesh screen or about 5 mm. Consequently, the particle mass entering wet screen 206 where small particles are removed. Large particles have been removed by optimal step 210. Consequently, the feedstock in line 302 is dried and has a particle size less than 5 mm and greater than 350 mesh or about 50 microns.

Figure 5:
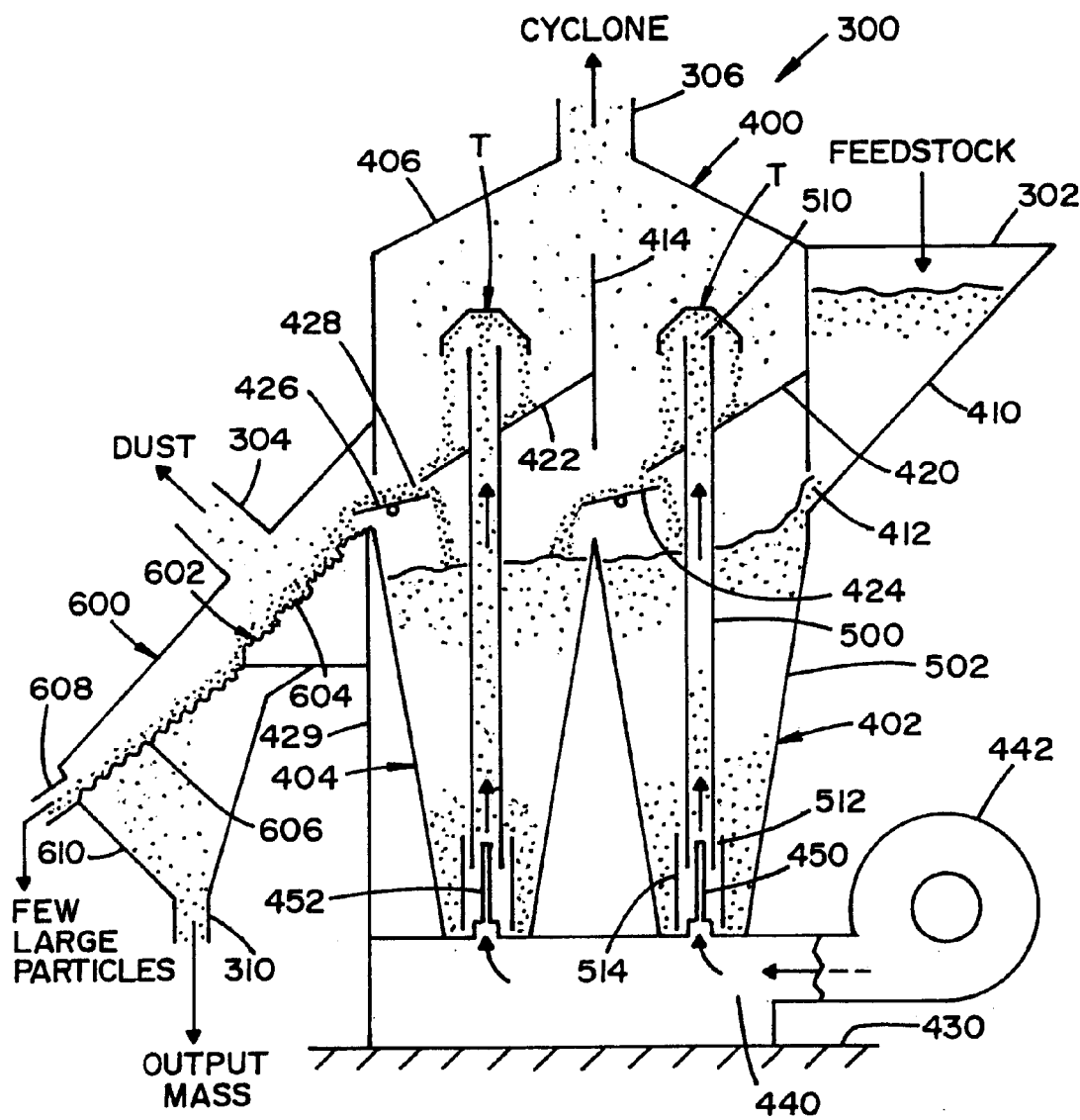
FIG. 5 is a side elevational view of a Simpson Pro-Claim sand reclaimer being used to perform the preferred embodiment of the present invention; and, FIG. 5A is an enlarged schematic view of the blast tube and fixed target used in performing the preferred embodiment of the present invention with dimensional and operational parameters displayed.

Station 300 includes a mechanism, such as an exhaust fan, for removing dust or product fines as indicated by step 304. A cyclone separator set to a value between 100-350 mesh to remove particles less than the selected screen size as disclosed by step 306. The dust fines are collected by accumulator 304a and the small particles from the cyclone separator 306 are collected by collector 306a. The operations of steps 304 and 306 use structures shown in FIG. 5 and FIG. 5A. The feedstock is processed in two stages, each of which is performed for a period of 5-25 minutes. The total process time for station 300 is called the "resident time" for device or machine 400. The total resident time is the accumulated time for the number of stages determined at step 308. Two steps are performed by machine 400 and this is repeated until the feedstock produces its final output mass in conduit 310. In practice, the feedstock is passed through machine 400, as shown in FIG. 5. At step 308 the operation of the two step machine is performed the number of times to give between 2 and 20 processing stages so feedstock is converted to the desired roundness and sphericity of the final output mass in conduit 310. The two stage machine illustrated in FIG. 5 can be used for successive processing of the feedstock or several of these machines can be connected successively for in-line processing. As an alternative several two stage machines operated in a series will produce the desired processing resident time. When using the preferred embodiment, two to twenty separate processing stages are used on the feedstock to produce an output mass in conduit 310.

Figure 5A:
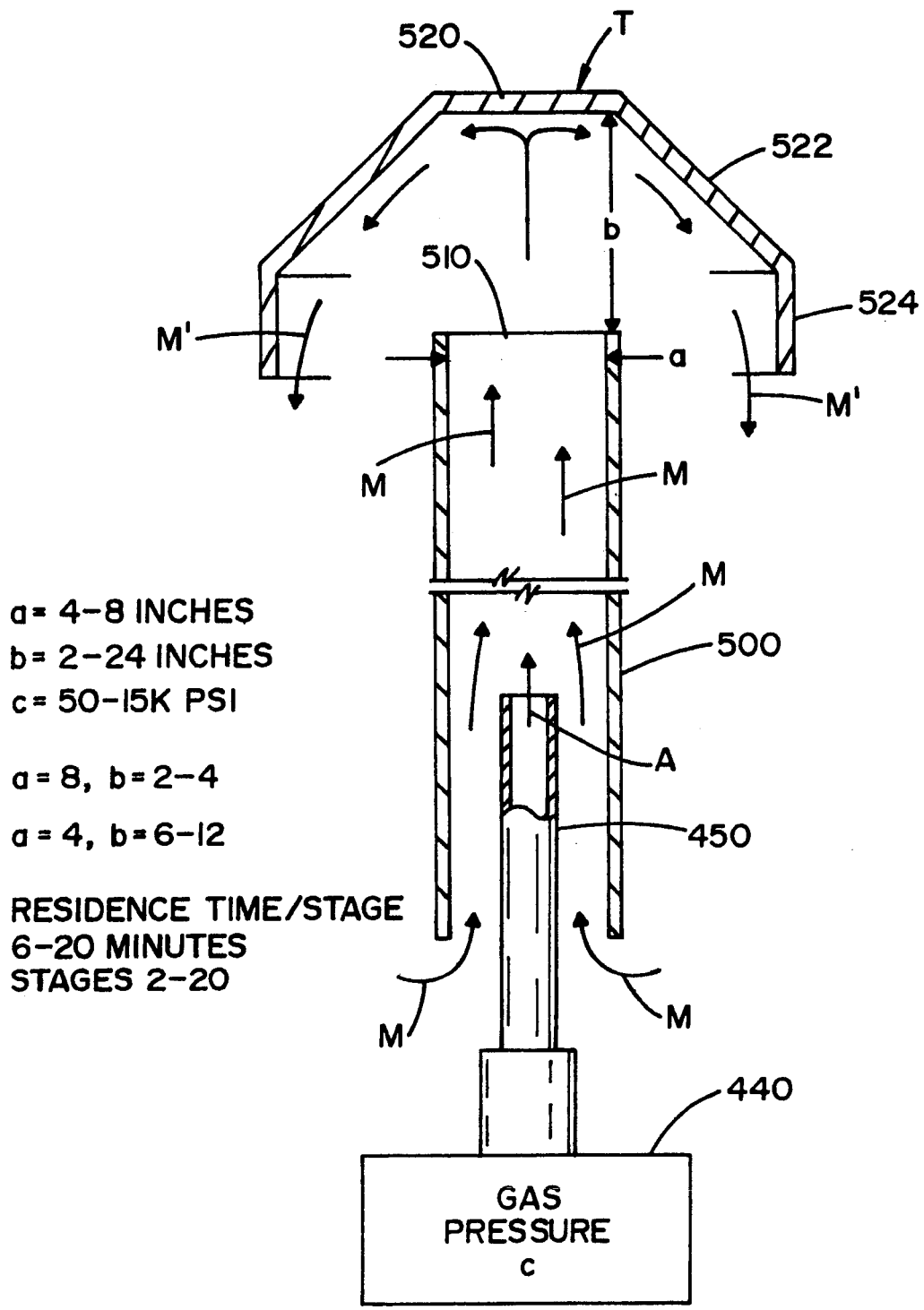

After the feedstock has been repeatedly subjected to grain to grain contact and collision in mass with the fixed target, the final output in conduit 310 is then passed through the selected screening process as shown in FIG. 2. This aspect of method 200 is indicated by step 312 to produce a product in conduit 130, as the product is graded by screens in FIG. 2. The product in conduit 130 is then transported by bags or other containers for use in gas or oil wells. In summary, method 200 converts feedstock in line 302 by several passes through station 300. In this process, dust is removed as indicated by step 304 and a cyclone classifier 306 is used to remove the very small particles from the particle mass being processed. The cyclone classifier is set to remove the minimum particle size of the selected grade for the frac sand. The cyclone product is air classified to a size generally in the range of 100-350 mesh. The equipment now used for performing the operation of station 300 is a Simpson Pro-Claim machine 400, as shown in FIGS. 5 and 5A. The abraded sand is removed from conduit or step 310, which constitutes the final output mass. As indicated by step 308, after removing the output mass from the two stage station 300, the two stage abrasion procedure of station 300 is repeated several times. The two stage procedure of station 300 is performed several times. Each "time" is referred to as one stage in the two stage machine as shown in FIG. 5. In practice, the process is repeated over four times with the resident time of each stage being controlled to a value of 5-25 minutes. The number of repeat operations at step 308 determines the controlled resident time of the preferred implementation. The resident time and the number of repeated use of station 300 to get an acceptable final product is not a limitation to the invention. Indeed, station 300 could be operated for longer times and used only two stages to accomplish the desired total resident time. After the feedstock has been repeatedly processed for controlled total resident time to produce the final output mass at conduit 130, the final output mass is graded by the screening procedure set forth in FIG. 2 to produce the selected grade frac sand constituting product FS.

System and Machine 400 (FIGS. 5 and 5A)

Method 200 illustrated in FIG. 4 is performed by equipment to effect the various steps constituting the preferred embodiment of the method. These various steps are combined to constitute method 200. The invention is also a system to perform method 200 for converting common naturally occurring silica sand into highly desirable frac sand equivalent to natural frac sand heretofore available only from a limited number of naturally occurring sources. The inventive system incorporates a machine to perform the steps of method 200. The machine for performing station 300 in the preferred embodiment is machine 400 shown in FIGS. 5 and 5A; however, the system is broader than the particular illustrated machines and equipment used in the preferred embodiment. The system is more broadly defined in the original claims of this application which constitute further disclosure of a system forming an aspect of the present invention.

In practicing the preferred embodiment of the present invention station 300 is a Simpson Pro-Claim device or machine. This machine is schematically illustrated in FIG. 5 and FIG. 5A, the latter of which contains parameters used in adjusting certain aspects of machine 400 to perform function of station 300 in method 200. The Simpson Pro-Claim machine 400 includes two duplicate stages 402 and 404 operated in sequence for processing feedstock from inlet conduit 302. Machine 400 has a common hood 406 with inlet hopper 410 that receives feedstock and passes the feedstock through gate 412 into first stage 402. The two successive stages are divided by center wall 412 and each includes an inclined collector plate 420, 422 directing processed particles to recycle gates 423, 426, respectively. The gates are adjusted to determine the percentage of particles recycled by each stage before particles are exited through side gate 428 in vertical outlet wall 429. Feedstock from conduit 302 is directed toward hopper 410 and then through gate 412 into first processing stage 402. After the feedstock has been processed it falls onto incline plate 420 that deposits the processed material onto adjustable gate 424. Some of the material is recycled through stage 402 and the remainder is conveyed into second stage 404. After being processed in this second stage, the material drops on the material drops on inclined collector plate 422 for passage over gate 426 and then out side gate 428. Consequently, feedstock is processed twice by machine 400 using consecutive processing stages 402, 404. The two stage machine is supported on base 430, which base includes plenum chamber 440 having a high pressure blower 442 to force pressurized air into the plenum chamber at a controlled pressure c. Pressure c can be varied between 50-15 k psi and is preferably about 50-100 psi for the present invention. Stage 402 is communicated with plenum chamber 440 by vertical pressure tube 450 and stage 404 is communicated with the plenum chamber by vertical pressure tube 452. These pressure tubes create the energy for the processing of the feedstock in the successive stages 402, 404. The first stage 402 will be described in detail using the partial structure of FIG. 5A. The same disclosure applies to second stage 404 driven by high pressure air from pressure tube 452.

Referring now jointly to FIGS. 5 and 5A, the first processing stage 402 includes a vertical blast tube 500 and a conical collector hopper 502. Material in hopper 502 is propelled through blast tube 500 from an annular opening 512 defined by outer cylindrical shield 514. Outlet 510 at the upper portion of blast tube 500 has a diameter a with the selectable values listed in FIG. 5A. Particle mass M shown in FIG. 5A is directed through annular opening 512 into the lower portion of blast tube 500 and is propelled upwardly at high pressure caused by air flow A from pressure tube 450. Particles in blast tube 500 are abraded by contact between the fast moving particles as they are propelled by blast tube 500 toward target T. Fixed metal target T includes wall 520 orthogonal to tube 500 and spaced from outlet 510 a distance b that can be changed as indicated in FIG. 5A. Flat wall 520 is surrounded by conical skirt 522 and outlet cylindrical baffle 524 for guiding processed particle mass M' from target T downward toward inclined collector plate 420, as best shown in FIG. 5. Blast tube 500 and target T cause abrading of the particles in mass M by particle to particle abrasion and abrasive and collision action against wall 520 of target T made of hardened steel. In this way, the incoming feedstock from hopper 410 is first processed by blast tube 500 and then by target T to change the roundness and sphericity of modified particles M', as the mass exits from target T toward inclined plate 420 and then to gate 424. Some of the particles are recirculated to combine with incoming feedstock for blast tube 500. A larger portion of the processed particles of mass M' are directed to the second stage 404 for further reprocessing. Thereafter, the twice processed mass of particles is directed through gate 428 toward outlet hood 600. This hood includes a dust outlet conduit 304 connected with an appropriate exhaust fan to remove small dust particles from the material in hood 600. Hood 600 also includes an inclined outlet wall 602 having a first step portion 604 and a lower screened portion 606 that removes large particles to be discharged through opening 608. Smaller particles pass through screen portion 606 toward collector bowl 610 which is communicated with outlet conduit 310 for output of particle mass. This mass is formed at the end of the processing two stage machine to produce the final output mass in conduit 310 for transfer to the screening operation 312 shown in FIG. 4. The two stage processing of machine 400 is repeated several times so that the ultimate output from collector bowl 610 is the final output mass. Several stages can be arranged in series to produce an in line operation. In accordance with the practical implementation of the present invention, the processed mass is repeatedly directed through the two stage machine 400 to ultimately produce a final output mass having the desired roundness and sphericity for a frac sand.

Overview

The invention involves the concept of abrading the particles by particle-to-particle contact at high velocity and also by impinging the particles as a mass and at high velocity against a metal member. This dual processes are performed on the incoming feedstock until it is converted into a desirable roundness and sphericity acceptable by the API for frac sand. The frac sand is graded as indicated by stage 312 of method 200 and is then tested for its k value. It has been found that using method 200 and the system for performing this method produces frac sand from silica sand having over 80% $SiO_2$, which frac sand has a roundness and sphericity greater than 0.7 and a k value greater than 4 k. This created frac sand is equivalent to naturally occurring frac sand and can be produced at a value less than the normal market value of naturally occurring frac sand.

Crush Test of Product

To obtain the k value, a crush test is performed wherein the processed frac sand of the present invention is crushed by a selected pressure, such as 6,000 psi. Then the percentage of fines that pass through the lower screen of a dual screening system as shown in FIG. 2 is measured. If the grade is 16/30, then the amount of fines passing through a 30 mesh screen after the processed frac sand has been crushed by 6,000 psi must be less than 10% for that particular grade to be acceptable for a frac sand requiring such a high k value. Thus, the crush test of the frac sand is a specification defining the crushing pressure of the frac sand which has been produced by the method illustrated in FIG. 4.

Examples

In one implementation of the present invention, four stages of processing was performed using station 300. Each stage had a resident time of 18 minutes to give a total process time of about 80 minutes. The incoming naturally occurring mineral was silica sand from the Uttica Mines. The parameters for the Simpson Pro-Claim machine 400 were set with a=4 inches, b=5 inches and c=80 psi. The grade for the product was 16/30. Another run was conducted on a similar mined mineral with a resident time per stage of 6 minutes. The distance b was increased to 6 inches. The end results were similar. Each run gave a dynamic reduction in turbidity, i.e. reduction in unwanted trace elements. The k value was 6,000. Turbidity was decreased from about 400 to 160. These runs produced acceptable frac sand with a k value of 6 and a grade of 16/30. The turbidity was drastically below the acceptable value of the American Petroleum Institute. Other runs have been conducted on different incoming silica sands and produced a frac sand having acceptable characteristics to be used as a commercial frac sand.

Feedstocks

The feedstock for practicing the invention as so far described is naturally occurring mined silica sand having a $SiO_2$ greater than 80%. The sand is "round" to "angular". These are the individual particle shapes and they are found in naturally occurring silica sand. The preferred feedstock has a very low roundness and sphericity. Such natural silica sand can not be used as frac sand. In practice, the starting silica sand has a maximum grain size of less than 8.0 mm. Indeed, the feedstock now used comes from the mine with a particle size between 20 microns and about 6.0-8.0 mm. Such feedstock has been converted into frac sand by the invention. It has been found that the other "hard materials" can be mined and crushed for conversion by the invention into an acceptable proppant. Hard as defined by the Mohs scale is at least 6. Thus, the process used to produce frac sand from silica sand can also be used to produce a proppant from other hard minerals by changing the feedstock. The process can also be used to process a feedstock of ceramic particles. The invention improves the physical characteristics of such man-made proppant. It has also been determined after the invention was made that it can be used for processing a feedstock of olivine used in the foundry industry. By drastically increasing the roundness and sphericity of the olivine particles, a lesser amount of binder is required for producing metal casting molds and the olivine is otherwise enhanced.

Modifications

Although the preferred embodiment of the invention involves the impingement of the rapidly moving particles against a fixed metal target T, it has been found that the invention is broader in that it merely requires the collision with a metal object whether fixed or not fixed. However, the invention involves the use of a Simpson Pro-Claim machine 400 which constitutes the invention. But, the invention is hereby defined in more broad terms as it relates to equivalent structures.

The various adjustments to the Simpson Pro-Claim machine and the order and magnitude of the steps of method 200 can be changed without departing from the intended spirit and scope of the present invention, as defined by the appended claims.

The invention claimed is:

1. A method of making a proppant from a naturally occurring, mined granular mineral having a hardness over 6.0 Mohs, said method comprising:
   (a) converting said granular mineral into a feedstock of particles having a maximum particle size and a given sphericity;
   (b) subjecting said feedstock to a high velocity mechanical action to increase the sphericity of the particles of said feedstock;
   (c) continuing said high velocity mechanical operation for a time to convert said given sphericity of said particles of said feedstock into a proppant with a processed sphericity greater than 0.60.

2. The method as defined in claim 1 wherein said high velocity mechanical action includes abrading said particles by particle-to-particle contact.

3. The method as defined in claim 2 wherein said high velocity mechanical action includes impinging said particles at high velocity against a metal member.

4. The method as defined in claim 3 wherein said metal member is fixed.

5. The method as defined in claim 2 wherein said processed sphericity is greater than about 0.80.

6. The method as defined in claim 2 wherein said proppant is frac sand and said mineral is silica sand.

7. The method as defined in claim 6 wherein said silica sand has at least 80% $SO_2$.

8. The method as defined in claim 2 including:
   (d) screening said proppant into a selected grade.

9. The method as defined in claim 1 wherein said high velocity mechanical action includes impinging said particles at high velocity against a metal member.

10. The method as defined in claim 9 wherein said metal member is fixed.

11. The method as defined in claim 1 wherein said processed sphericity is greater than about 0.80.

12. The method as defined in claim 1 wherein said proppant is frac sand and said mineral is silica sand.

13. The method as defined in claim 12 wherein said silica sand has at least 80% $S_1O_2$.

14. The method as defined in claim 1 including:
    (d) screening said proppant into a selected grade.

15. The method as defined in claim 14 wherein said selected grade has a maximum size of 6-35 mesh and a minimum size of 20-140 mesh.

16. The method as defined in claim 14 wherein said selected grade has a maximum size in the range of 12-20 mesh and a minimum size in the range of 30-50 mesh.

17. The method as defined in claim 1 wherein said high velocity mechanical action involves moving said feedstock at a high velocity.

18. The method as defined in claim 17 wherein said high velocity mechanical action includes impinging said particles at high velocity against a metal member.

19. The method as defined in claim 18 wherein said processed sphericity is greater than about 0.80.

20. The method as defined in claim 18 wherein said proppant is frac sand and said mineral is silica sand.

21. The method as defined in claim 20 wherein said silica sand has at least 80% $S_1O_2$.

22. The method as defined in claim 18 wherein said metal member is fixed.

23. The method as defined in claim 17 wherein said processed sphericity is greater than about 0.80.

24. The method as defined in claim 17 wherein said proppant is frac sand and said mineral is silica sand.

25. The method as defined in claim 24 wherein said silica sand has at least 80% $S_1O_2$.

26. The method as defined in claim 17 including:
    (d) screening said proppant into a selected grade.

27. The method as defined in claim 1 wherein said mineral is naturally occurring olivine.

* * * * *

UNITED STATES PATENT AND TRADEMARK OFFICE
CERTIFICATE OF CORRECTION

PATENT NO. : 8,464,969 B2  Page 1 of 1
APPLICATION NO. : 13/197520
DATED : June 18, 2013
INVENTOR(S) : Ziegler It is certified that error appears in the above-identified patent and that said Letters Patent is hereby corrected as shown below:

In the Claims

Column 13, Line 40 (Claim 7, Line 2), delete "$SO_2$" and insert --$SiO_2$--.

Column 14, Line 11 (Claim 13, Line 2), delete "$S_1O_2$" and insert --$SiO_2$--.

Column 14, Line 31 (Claim 21, Line 2), delete "$S_1O_2$" and insert --$SiO_2$--.

Column 14, Line 39 (Claim 25, Line 2), delete "$S_1O_2$" and insert --$SiO_2$--.

Signed and Sealed this
Thirteenth Day of August, 2013

Teresa Stanek Rea
*Acting Director of the United States Patent and Trademark Office*